United States Patent
Tamada

(10) Patent No.: US 9,682,676 B2
(45) Date of Patent: Jun. 20, 2017

(54) IMPACT ABSORBER

(71) Applicant: KYORAKU CO., LTD., Kyoto-shi, Kyoto (JP)

(72) Inventor: Teruo Tamada, Yamato (JP)

(73) Assignee: KYORAKU CO., LTD., Kyoto-shi (JP)

( * ) Notice: Subject to any disclaimer, the term of this patent is extended or adjusted under 35 U.S.C. 154(b) by 0 days.

(21) Appl. No.: 15/023,970

(22) PCT Filed: Sep. 5, 2014

(86) PCT No.: PCT/JP2014/073536
§ 371 (c)(1),
(2) Date: Mar. 22, 2016

(87) PCT Pub. No.: WO2015/045807
PCT Pub. Date: Apr. 2, 2015

(65) Prior Publication Data
US 2016/0207488 A1    Jul. 21, 2016

(30) Foreign Application Priority Data
Sep. 26, 2013   (JP) .................. 2013-200388

(51) Int. Cl.
*B60R 21/055*  (2006.01)
*B60R 21/02*   (2006.01)
(Continued)

(52) U.S. Cl.
CPC ........... *B60R 21/055* (2013.01); *B60R 21/02* (2013.01); *B60R 21/04* (2013.01); *F16F 7/00* (2013.01)

(58) Field of Classification Search
CPC ....... B60R 21/055; B60R 21/04; B60R 21/02; F16F 7/00
See application file for complete search history.

(56) References Cited

U.S. PATENT DOCUMENTS 6,406,079 B2   6/2002  Tamada et al.
7,111,713 B2 * 9/2006  Tamada .................. B60R 19/18
                                                      188/371
(Continued)

FOREIGN PATENT DOCUMENTS

JP    2002-187508 A    7/2002
JP    2003-048501 A    2/2003
(Continued)

OTHER PUBLICATIONS

Mar. 29, 2016 International Preliminary Report on Patentability issued in International Patent Application No. PCT/JP2014/073536.
(Continued)

*Primary Examiner* — Drew J Brown
(74) *Attorney, Agent, or Firm* — Oliff PLC

(57) ABSTRACT

The impact absorber disposed between a vehicle panel and a trim has a hollow main body with a first wall disposed adjacent the trim and a second wall disposed adjacent the vehicle panel and opposed to the first wall. The hollow main body is defined by a first portion and a second portion. The impact absorber has at least one first concave rib formed in the second portion by recessing the first and second walls such that they approach each other and joining tips of recessed first and second walls each other, and at least one groove-like depression formed in the first portion by recessing the second wall. The first portion is greater than the second portion in a total thickness from the first wall to second wall.

13 Claims, 8 Drawing Sheets

(51) Int. Cl.
*F16F 7/00* (2006.01)
*B60R 21/04* (2006.01)

(56) References Cited

U.S. PATENT DOCUMENTS

| | | | | |
|---|---|---|---|---|
| 7,249,662 B2 * | 7/2007 | Itou | ................ | F16F 7/12 |
| | | | | 188/371 |
| 7,370,893 B2 * | 5/2008 | Tamada | ................ | B60R 19/18 |
| | | | | 293/120 |
| 7,618,082 B2 * | 11/2009 | Tamada | ................ | B60R 19/18 |
| | | | | 296/146.6 |
| 8,104,805 B2 * | 1/2012 | Suzuki | ................ | B60R 19/18 |
| | | | | 293/132 |
| 8,123,263 B2 * | 2/2012 | Evans | ................ | B60R 19/18 |
| | | | | 293/132 |
| 8,439,400 B2 | 5/2013 | Suzuki et al. | | |
| 8,443,950 B2 * | 5/2013 | Tamada | ................ | B60R 19/18 |
| | | | | 188/371 |
| 8,641,131 B2 * | 2/2014 | Honda | ................ | B62D 25/025 |
| | | | | 296/187.12 |
| 8,915,536 B2 * | 12/2014 | Tamada | ................ | B60R 21/04 |
| | | | | 296/187.05 |
| 2002/0005644 A1 | 1/2002 | Tamada et al. | | |
| 2008/0203749 A1 * | 8/2008 | Tamada | ................ | B60R 19/18 |
| | | | | 296/1.04 |

FOREIGN PATENT DOCUMENTS

| | | |
|---|---|---|
| JP | 2010-107027 A | 5/2010 |
| JP | 2012-076569 A | 4/2012 |
| JP | 2012-076570 A | 4/2012 |

OTHER PUBLICATIONS

Nov. 4, 2014 Search Report issued in International Patent Application No. PCT/JP2014/073536.

* cited by examiner thickness of impact absorber: 1.5mm thickness of impact absorber: 1.65mm thickness of impact absorber: 1.85mm

IMPACT ABSORBER

TECHNICAL FIELD

The invention relates to an impact absorber, in particular, an impact absorber which is disposed between a vehicle panel and a trim so as to absorb an impact of vehicle collision.

BACKGROUND OF THE INVENTION

Conventionally, an impact absorber having a hollow wall structure, which is formed by blow molding of thermoplastic resin, as disclosed in, for example, Patent Document 1 has been known.

The impact absorber as disclosed in Patent Document 1 is provided for protecting, for example, the low back of a passenger and has a first portion corresponding to the pubis of the passenger and a second portion corresponding to the ilium of the passenger. The first portion is made such that the stress occurring when the impact absorber is subjected to impact is a predetermined value or below, and the second portion is made such that the stress occurring when the impact absorber is subjected to impact is a predetermined value or above.

In a specific embodiment disclosed in Patent Document 1, the first portion of the impact absorber may be relatively great and the second portion of the impact absorber may be relatively little in terms of the total thickness in a direction where the impact is applied (i.e., the direction of impact). A concave rib is formed by recessing the walls which are opposed to each other in the direction of impact and joining tips of recessed walls as thus obtained each other. In this case, as due to the load from the passenger the impact absorber is deformed with compression, the concave rib renders the stress of the impact absorber occurring against the passenger moderately adjustable.

However, in the afore-mentioned impact absorber, the concave rib is not formed in the first portion, and is formed in the second portion. For this reason, in a case where the first portion has a relatively large area surface, due to the lack of the concave rib (in the first portion) the impact absorber may not sufficiently serve as the impact absorber.

In other words, due to the impact from the outside of the vehicle (on the first portion) the impact absorber moves toward the passenger, and when colliding against the passenger via the trim it become deformed. During the deformation of the impact absorber, energy is consumed, and the mitigation of the impact on the passenger is thus obtained. However, when due to the impact from the outside of the vehicle the impact absorber is pressed to move toward the passenger, it may come in contact with other part(s) such as an impact beam and an outer pad which is disposed exteriorly of the impact absorber in the vehicle. In this case, when due to the specific shape of the other part local stress is given to the first portion of the impact absorber, the first portion is early deformed before the impact absorber collides against the passenger. As a result, the function of the impact absorber, the mitigation of the impact on the passenger cannot be securely attained.

In view of the above, it may be considered that the concave rib is also formed in the first portion of the impact absorber. In this case, the stress occurring when the impact absorber is subjected to impact may be a predetermined value or above, and a weak or fragile portion of the passenger such as a pubis may not be protected.

CITATION LIST

Patent Literature

Japanese patent publication No. 2012-76569 (A)

BRIEF DESCRIPTION OF THE INVENTION

The invention is provided for the purpose of solving the above drawbacks or problems. The objective of the invention is to provide an impact absorber, which has variable total thickness in the direction of impact and is capable of producing a moderately adjusted stress against the passenger, without being early deformed or collapsing prior to the collision with the passenger.

The invention provides an impact absorber (1), which is disposed between a vehicle panel and a trim, and has a hollow main body. The hollow main body has a first wall disposed adjacent to the trim and a second wall disposed adjacent to the vehicle panel and opposed to the first wall. The hollow main body is defined by a first portion and a second portion. The impact absorber also has at least one first concave rib, which is formed in the second portion of the hollow main body by recessing the first and second walls such that the first and second walls approach each other and joining tips of recessed first and second walls as thus obtained each other, and at least one groove-like depression, which is formed in the first portion of the hollow main body by recessing the second wall. The first portion is different from the second portion in a total thickness extending from the first wall to second wall. The total thickness of the first portion is greater than that of the second portion.

(2) In the impact absorber (1), the depression may have a depth of 3 mm or above.

(3) In the impact absorber (1), the depression may have a depth of 25% or below of the total thickness of the first portion.

(4) In the impact absorber (1), the depression may have a depth which increases from a middle portion thereof to both ends thereof.

(5) In the impact absorber (1), the at least one depression may be a plurality of the depressions, and a first depression out of the plurality of depressions may intersect with the other depression out of the plurality of depressions.

(6) In the impact absorber (1), the hollow main body may further have a second concave rib, which is formed in a boundary between the first portion and the second portion by recessing the first and second walls such that the first and second walls approach each other and joining recessed tips of recessed first and second walls as thus obtained each other.

(7) In the impact absorber (6), an end of the depression may be connected to the second concave rib.

(8) In the impact absorber (1), the hollow main body further has a semicircular third concave rib, which is formed in an outer periphery of the first portion not neighboring the second portion by recessing the first and second walls such that the first and second wall approach each other and joining tips of recessed first and the second walls as thus obtained each other.

(9) In the impact absorber (8), one end of the depression may be connected to the third concave rib.

The proposed impact absorber has variable total thickness in the direction of impact, and can produce moderately adjusted stress against the passenger, without being early deformed or collapse prior to the collision with the passenger.

DETAILED DESCRIPTION OF THE INVENTION

Figure 1A:
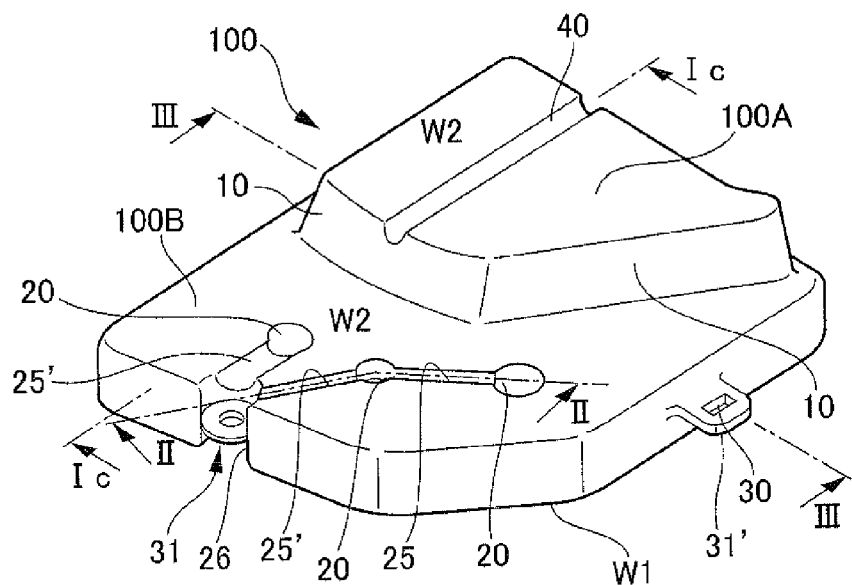
FIG. 1A is a perspective view of a first embodiment of an impact absorber in accordance with the invention.

Referring to the accompanying drawings, embodiments of the present invention will be hereinafter described in detail. Furthermore, the same reference numeral is assigned to the same element or part throughout the overall specification. While the embodiments are described using a door panel as a vehicle panel and a door trim as a trim, it should be understood that it is apparent to one skilled in the art that the concept of the invention can be applied to the vehicle panel and the trim other than the door panel and the door trim.

First Embodiment

Figure 1B:
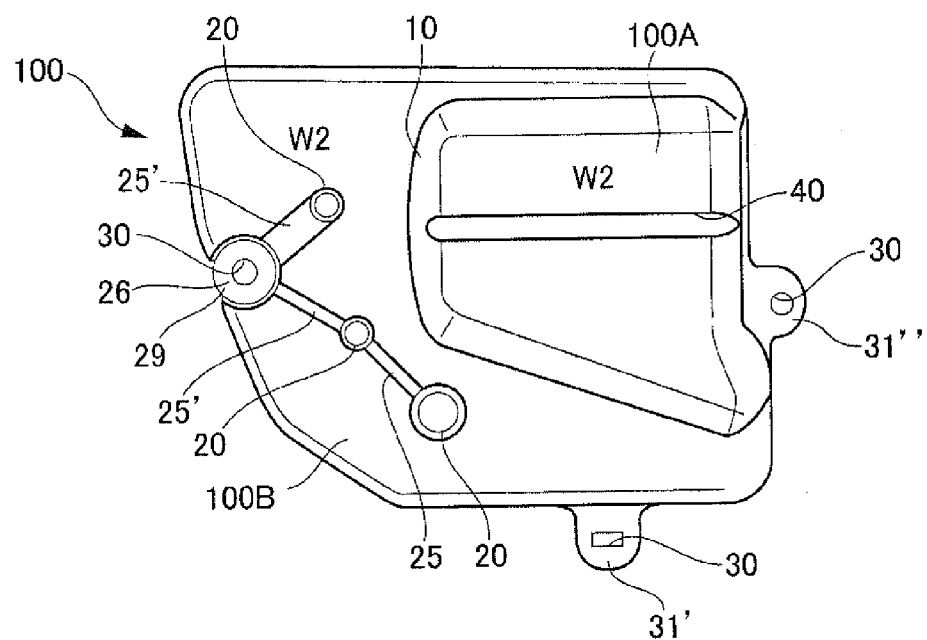
FIG. 1B is a plan view of the first embodiment.
Figure 1C:
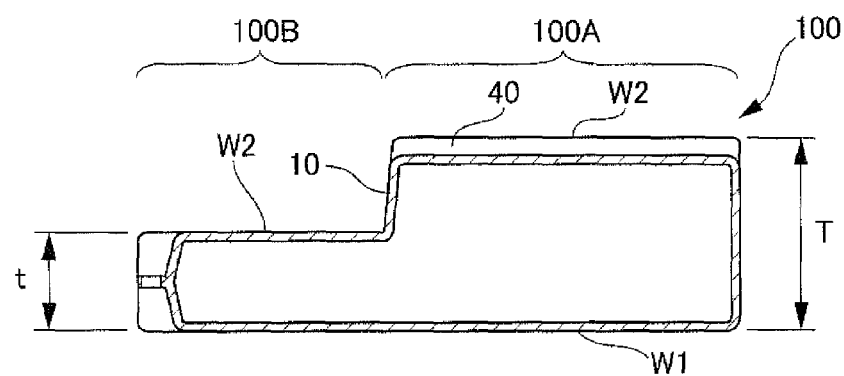
FIG. 1C is a cross-sectional view of FIG. 1A along the line Ic-Ic.

FIG. 1A is a perspective view of a first embodiment of an impact absorber in accordance with the invention; FIG. 1B is a plan view of the first embodiment; and FIG. 1C is a cross-sectional view of FIG. 1A along the line Ic-Ic.

Figure 10A:
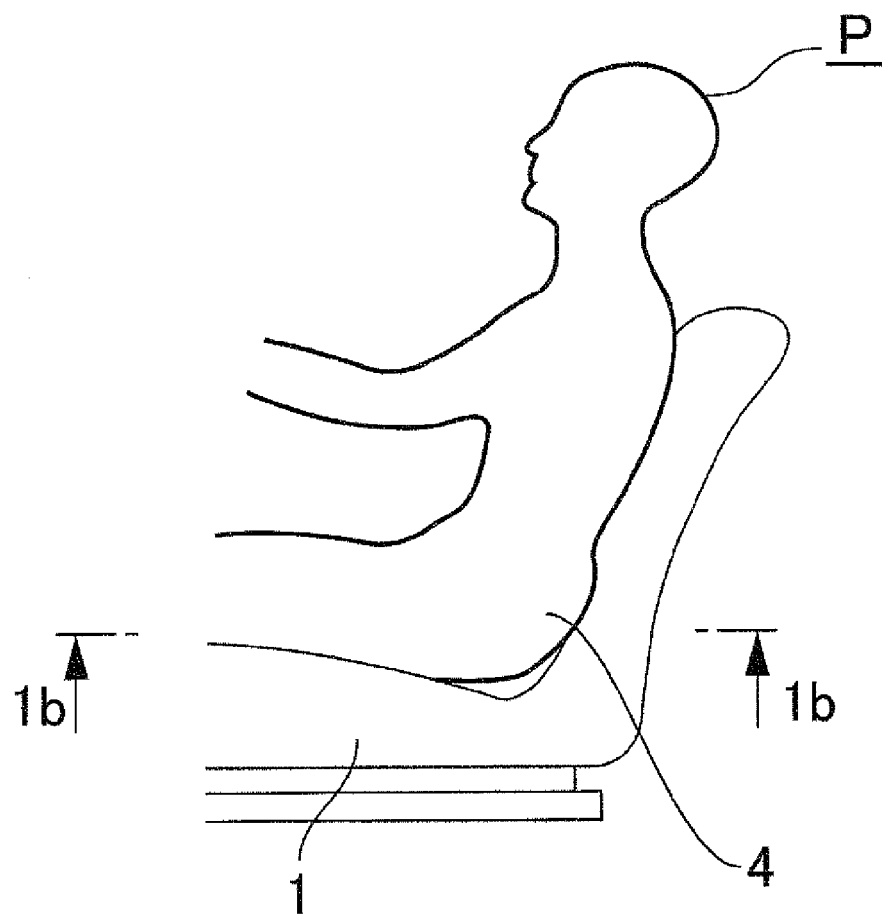
FIG. 10A is a side view for illustrating an exemplary application of an impact absorber in accordance with the invention.
Figure 10B:
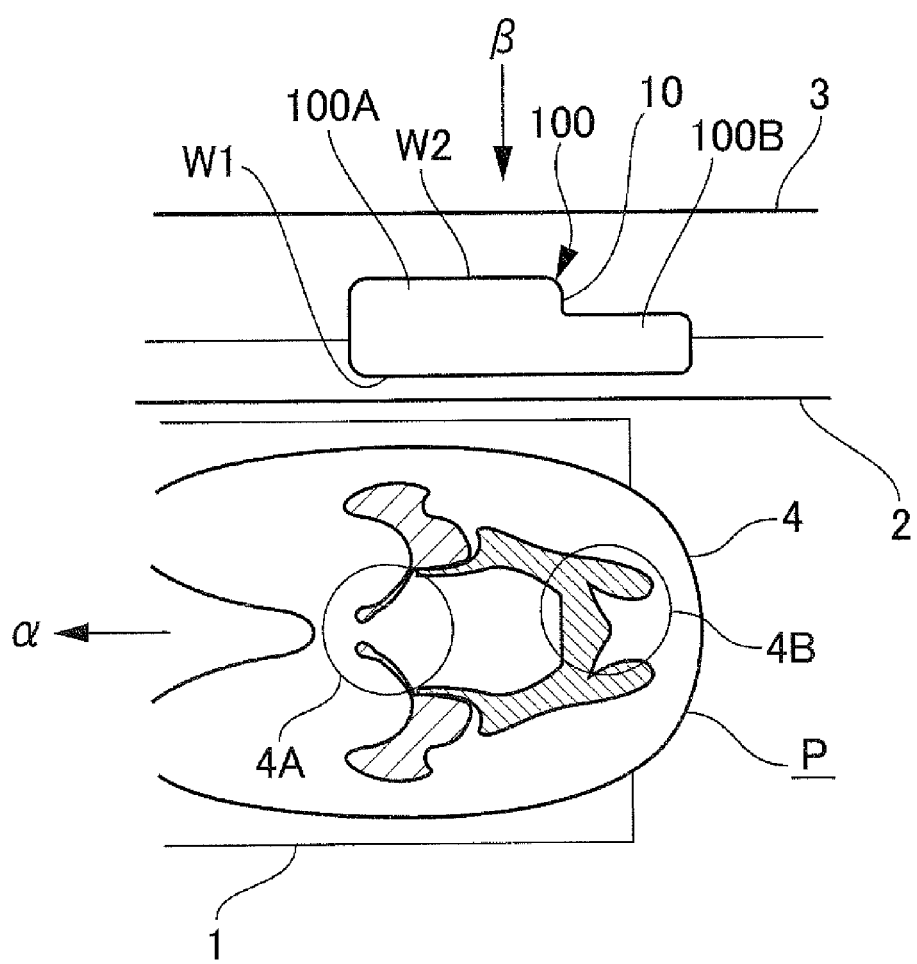
FIG. 10B is a cross-sectional view of FIG. 10A along line Ib-Ib.

Before illustrating the configuration of the embodiment of an impact absorber in accordance with the invention, the application or use of the impact absorber is hereinafter described with reference to FIGS. 10A and 10B. FIGS. 10A and 10B show that a dummy as a passenger P sits on a bottom 1 of a seat of the vehicle. FIG. 10A is a side view and the FIG. 10B is a cross-sectional view of FIG. 10 along the lines Ib-Ib. Referring to FIG. 10B, a door trim 2 defining the side portion of a vehicle interior is lateral to the bottom 1. The door trim 2 extends in an anteroposterior direction of the vehicle (i.e., a direction in FIG. 10B). Furthermore, a door panel (i.e., an outer door panel) 3 is disposed exteriorly of the door trim 2 and substantially in parallel with the door trim 2. An impact absorber 100 is disposed between the door trim 2 and the door panel 3, and adjacent to the low back of the passenger P. As such, the impact absorber 100 is disposed in a location which corresponds to the low back of the passenger P through the door trim 2.

Using a case where the impact absorber 100 is not provided, the impact on the low back of the passenger P when other vehicle runs into, for example, the door panel 3 of the vehicle (i.e., "β" direction in FIG. 10B) will be hereinafter explained.

In other words, when other vehicle runs into the vehicle from the door panel 3, the door trim 2 bulges such that it approaches the passenger P and abuts against the low back 4 of the passenger P. In a case where the low back 4 of the passenger P abuts against the door trim 2 such that the it is placed immediately lateral to the door trim 2, the load applied on the low back 4 of the passenger P from the door trim 2 shows a characteristic biased distribution in the skeleton of the low back 4. Specifically, initial load applied to the low back 4 has a tendency to directly concentrate on the anterior side (i.e., a pubis 4A) of a pelvis. Once the load concentrates on weak or fragile pubis 4A, it makes an effect on the pubis 4A. For example, in a case where a certain level of the load is applied to the pubis 4A, even in a case the same level of the load is applied to the anterior side (i.e., the pubis 4A) and a posterior side (i.e., an ilium 4B) of the pelvis respectively, the stress of the anterior side (i.e., the pubis 4A) of the pelvis become greater than that of the posterior side (i.e., the ilium 4B).

For the above reasons, in order to render the load on the pubis 4A of the pelvis less than the load on the ilium 4B of the pelvis, the stress occurring in the region corresponding to the pubis 4A of the pelvis in the impact absorber 100 should be less than the stress occurring in the region corresponding to the ilium 4B of the pelvis in the impact absorber 100. For this purpose, as shown in FIG. 10B, the impact absorber 100 disposed between the door trim 2 and the door panel 3 may be made such that the stress occurring with the impact is a predetermined value (for example, 2.5 kN per 100 cm$^2$) or below in a first portion 100A which corresponds to the pubis 4A of the passenger P, and the stress occurring with the impact is a predetermined value (for example, 7.0 kN per 100 m$^2$) or above in a second portion 100B which corresponds to the ilium 4B of the passenger P.

The impact absorber 100 substantially has a hollow main body, which has a first wall W1 disposed adjacent to the door trim 2 and a second wall W2 disposed adjacent to the door panel 3, and is formed of resin material. The first portion 100A has a total thickness (i.e., a total thickness from the substantially flat first wall W1 to the second wall W2 in a vertical direction of each wall W1, W2) greater than that of the second portion 100B. To this end, the impact absorber 100 is provided with a step 10 at a border between the first portion 100A and the second portion 100B.

Next, such an impact absorber 100 is described in more detail with reference to FIGS. 1A-1C. As mentioned previously, the impact absorber 100 has the hollow main body which is formed of resin material. The resin material which can be employed may be a rigid resin having a high level of mechanical strength, and include, but not limited to, polyolefin such as polyethylene and polypropylene, styrene such as polystyrene and ABS resin, polyester such as polyethylene terephthalate, or polyamide and a combination thereof.

Referring to FIG. 1A, the impact absorber 100 has the first portion 100A as one region and the second portion 100B as the other region. The first portion 100A and the second portion 100B are defined by the step 10 as the border. Due to the configuration, the total thickness of the first portion 100A (i.e., "T" in FIG. 1C) is greater than the total thickness of the second portion 100B (i.e., "t" in FIG. 1C). In this regard, the total thickness is a distance from the wall W1 to the wall W2.

Figure 2:
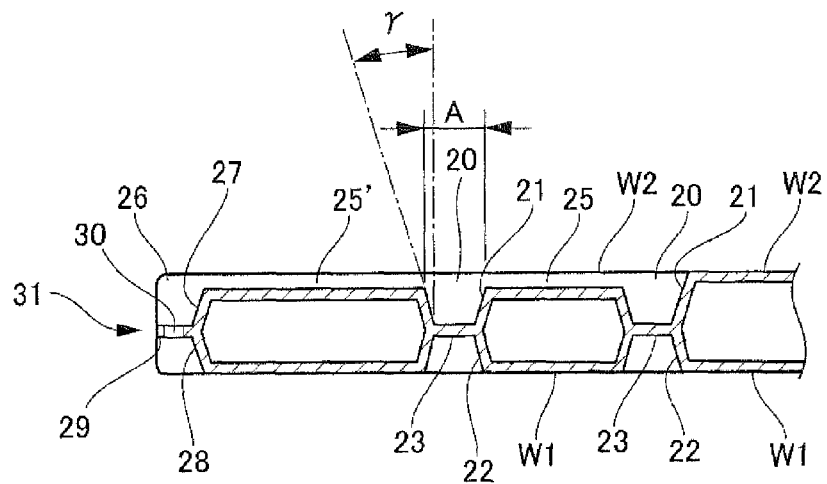
FIG. 2 is a cross-sectional view of FIG. 1A along the line II-II.

The second portion 100B is provided with a plurality of concave ribs 20 (e.g., three concave ribs in FIG. 1). In this regard, the concave rib may be also referred to as "a first concave rib" throughout the specification. Referring to FIG. 2 which is a cross-sectional view of FIG. 1A along the line II-II, The first concave ribs 20 has a joint 23, which can be formed by recessing a portion of the first wall W1 and a portion of the second wall W2 in a direction where they approaches each other, and joining the tip portions of the cone-shaped cylindrical portions 21, 22 as thus obtained each other. The second portion 100B is formed such that the plurality of first concave ribs 20 is scattered therein, thereby rendering the stress of the impact absorber 100 occurring against the passenger P moderately adjusted.

Furthermore, referring to FIG. 2, each of the cone-shaped cylindrical portions 21 and 22 of the first concave rib 20 is tapered in a direction from an open end of the first wall W1 or the second wall W2 toward a hollow portion. Tapering angle α may be from 3 degrees to 30 degrees, and the diameter A of the open end may be from 10 mm to 40 mm. As shown FIGS. 1A and 1B, the first concave rib 20 is circular at the open end. However, the invention is not limited to the above configuration, and the open end may be oval.

Moreover, there is provided a connecting rib 25 such that the connecting rib 25 connects to the neighboring first concave ribs 20. Referring to FIGS. 1A-1C, the connecting rib 25 may be a groove-like depression which is formed by recessing the second wall W2. The connecting rib 25 plays a role of retaining the posture (i.e., in a direction of the central axis) of the first concave rib 20 during the compression deformation of the impact absorber 100 so as to realize a proper compression deformation of the first concave rib 20.

Furthermore, a semicircular concave rib 26 is formed as the first concave rib in a part of the periphery of the second portion 100B except for the border between the first portion 100A and the second portion 100B. The semicircular concave rib 26 has a joint 29, which may be formed by recessing the first wall W1 and the second wall W2 in a direction where they approach each other and joining the tip portions of the cone-shaped cylindrical portions 27, 28 as thus obtained each other. The semicircular concave rib 26 has the same function as the afore-mentioned first concave rib 20. A connecting rib 25' is formed between the semicircular concave rib 26 and the first concave rib 20.

The joint 29 of the semicircular concave rib 26 constitutes a portion 31 for coupling the impact absorber 100. The portion 31 for coupling the impact absorber 100 has a screw insertion hole 30. Besides the portion 31 for coupling the impact absorber 100, there may be two portions 31', 31'' for coupling the impact absorber 100, which project from the side surface of the impact absorber 100 and have the screw insertion hole 30, as shown FIG. 1B.

Figure 3:
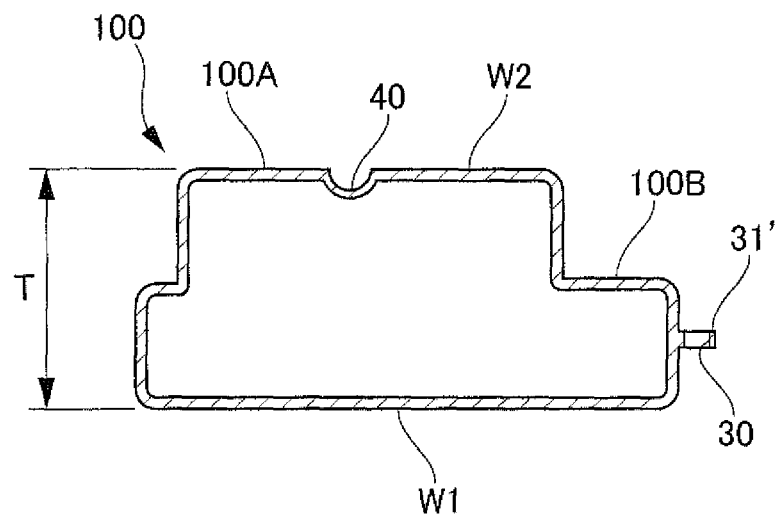
FIG. 3 is a cross-sectional view of FIG. 1A along the line III-III.

In accordance with the first embodiment, the afore-mentioned first concave ribs 20, 26 are not formed in the first portion 100A. This is because the first portion 100A protects the relatively weak or fragile portion (i.e., the pubis 4A) of the passenger P and the stress occurring when the impact absorber 100 is subjected to impact should be the predetermined value or below in the first portion 100A. On the other hand, a groove-like depression 40 is formed in the second wall W2 of the first portion 100A such that it traverses the area of the first portion 100A. FIG. 3A is a cross-sectional view of FIG. 1A along the line III-III. The groove-like depression 40 may have a semicircular cross-section. The each end of the groove-like depression 40 intersects with each of the opposed side wall surfaces which correspond to the step of the second wall W2.

The afore-mentioned groove-like depression 40 can avoid the risk of failing to do the function of mitigating the impact on the passenger P in comparison with an impact absorber where no groove-like depression 40 is formed. In other words, when due to the impact from the outside of the vehicle (onto the first portion 100A) the impact absorber 100 moves toward the passenger P to collide against the passenger P via the door trim 2 (see FIG. 10B), energy is consumed for the deformation of the impact absorber 100, thereby mitigating the impact on the passenger P. However, in this case, there is a risk that due to the impact from the outside of the vehicle the impact absorber 100 may be initially or early deformed or collapse and energy consumption accompanied by the deformation of the impact absorber 100 does not happen. In this case, the impact absorber 10 may fail to do its function of mitigating the impact on the passenger 10. By adopting such a depression 40 the risk can be avoided. In other words, the depression 40 can function as a moderate reinforcing member, which prevents the first portion 100A from early deformation.

Preferably, the depression 40 may be formed such that it has a depth of from 3 mm to 30 mm Preferably, the depression 40 may be formed such that it has a depth of from 1% to 25%, preferably from 5% to 20%, of the total thickness T of the first portion 100A. In viewpoint of the afore-mentioned function, the depth of the depression 40 may be preferably 3 mm or above. If the depression 40 having the depth of greater than 25% of the total thickness T is adopted, during collision of the impact absorber 100 the tip of the depression 40 immediately abuts against the first wall W1, thereby increasing the load. In order to avoid the afore-mentioned phenomenon or risk, the depth of the depression 40 is preferably 25% or below of the total thickness T of the first portion 100A. In other words, if the depth of the depression 40 is 25% or below of the total thickness T of the first portion 100A, the depression 40 makes little contribution to the increase of load.

Figure 4:
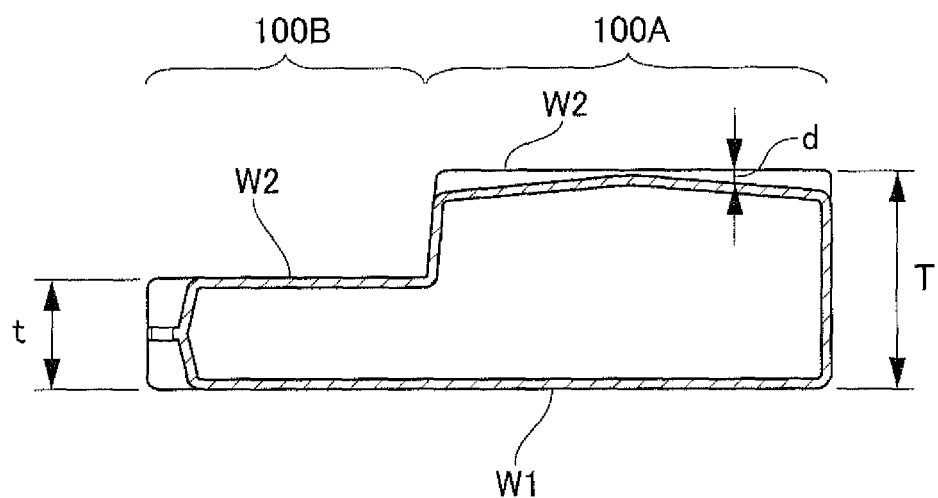
FIG. 4 show another embodiment and corresponds to FIG. 1C.

As shown in FIG. 4 which corresponds to FIG. 1C, the groove-like depression 40 may be formed such that the depth d increases from the middle portion toward both ends. By adopting the afore-mentioned configuration, the stiffness of the entire surface of the first portion 100A can be increased.

Furthermore, as shown in FIGS. 1A-1C, the depression 40 is formed across the first portion 100A. By adopting the above configuration, the stress occurring in the first portion 100A is delivered through the depression 40 to the side surface of the impact absorber 100 and thus effectively prevents early collapse or deformation of the first portion 100A in comparison with a case where the depression 40 is not formed across the first portion 100A.

While the groove-like depression 40 has the configuration similar to the connecting ribs 25, 25' which are formed in the second portion 100B, it is different from the connecting ribs 25, 25' in terms of function. For reference, the connecting ribs 25, 25' has the function of retaining the posture of the first concave rib 20. Accordingly, the groove-like depression 40 is distinguished from the connecting ribs 25, 25'.

In accordance with the impact absorber 100, even if the vehicle is subjected to initial impact from outside, due to the depression 40 the first portion 100A of the impact absorber 100 can be protected from early deformation or collapse. When due to the impact the impact absorber 100 moves toward the passenger P and collides against the passenger P via the door trim 2 (see FIG. 10B), energy is consumed for the deformation of the impact absorber 100, thereby mitigating the impact on the passenger P. For the reasons, the impact absorber 100 in which the stress occurring against the passenger P is moderately adjusted can be obtained.

Figure 5:
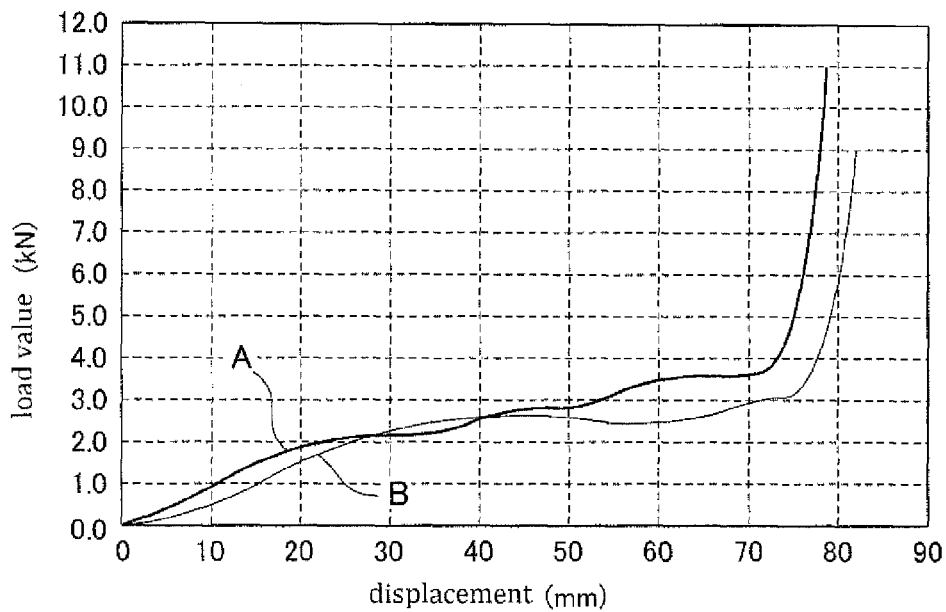
FIG. 5 is a graph showing the relationship between displacement (mm) and load value (kN). The thickness of the impact absorber used is 1.5 mm.
Figure 6:
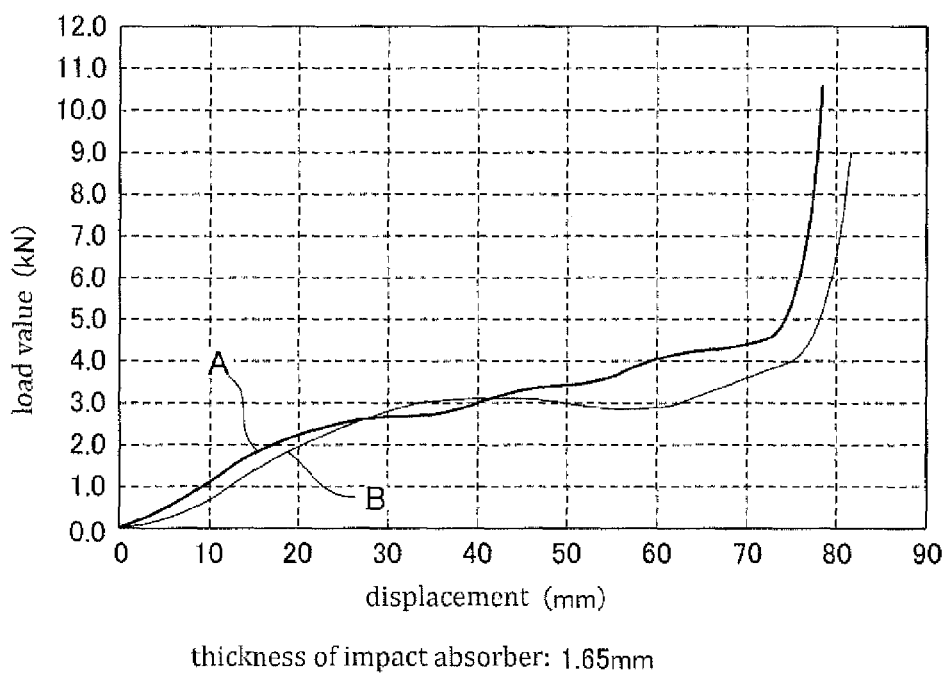
FIG. 6 is a graph showing the relationship between displacement (mm) and load value (kN). The thickness of the impact absorber used is 1.65 mm.
Figure 7:
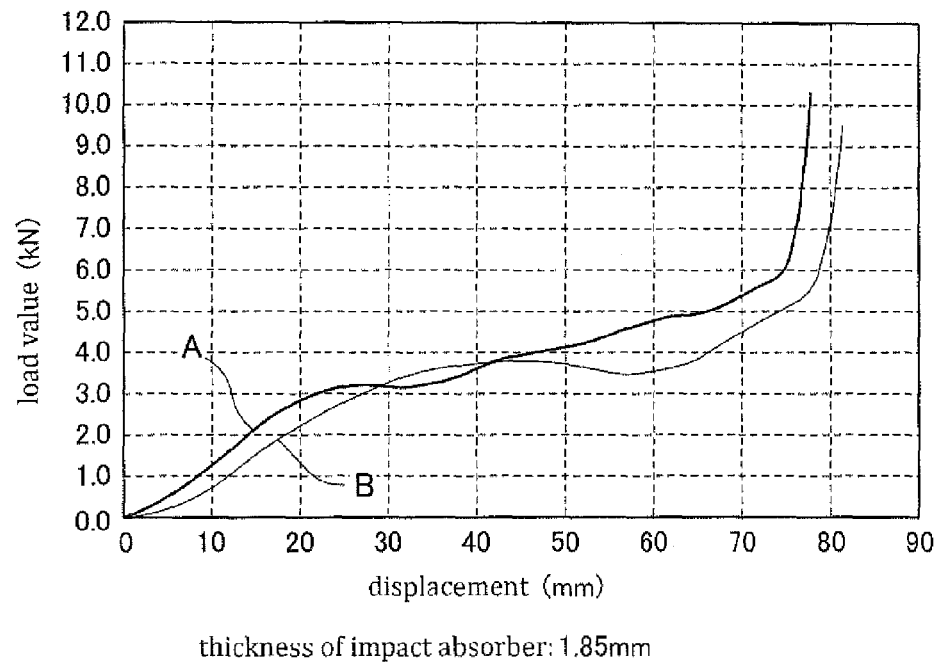
FIG. 7 is a graph showing the relationship between displacement (mm) and load value (kN). The thickness of the impact absorber used is 1.85 mm.

FIGS. 5-7 are graphs showing the relationship between displacement (mm) and load value (kN). FIG. 5 shows a case where the thickness of the impact absorber is 1.5 mm; FIG. 6 shows a case where the thickness of the impact absorber is 1.65 mm; and FIG. 7 show a case where the thickness of the impact absorber is 1.85 mm. In FIGS. 5-7, a curve A is a characteristic curve of the impact absorber 100 which has the depression 40 in the first portion 100A, and a curve B is a characteristic curve of an impact absorber which does not have the depression 40 in the first portion 100A. FIGS. 5-7 demonstrate that in the curve A, even if the load is applied in an initial step (around 20 kN), the amount of deformation is relatively little and no collapse or deformation of the first portion 100A occurs, in comparison with the curve B. Furthermore, it can be found that after that, mild impact absorbing properties is obtained.

Second Embodiment

Figure 8A:
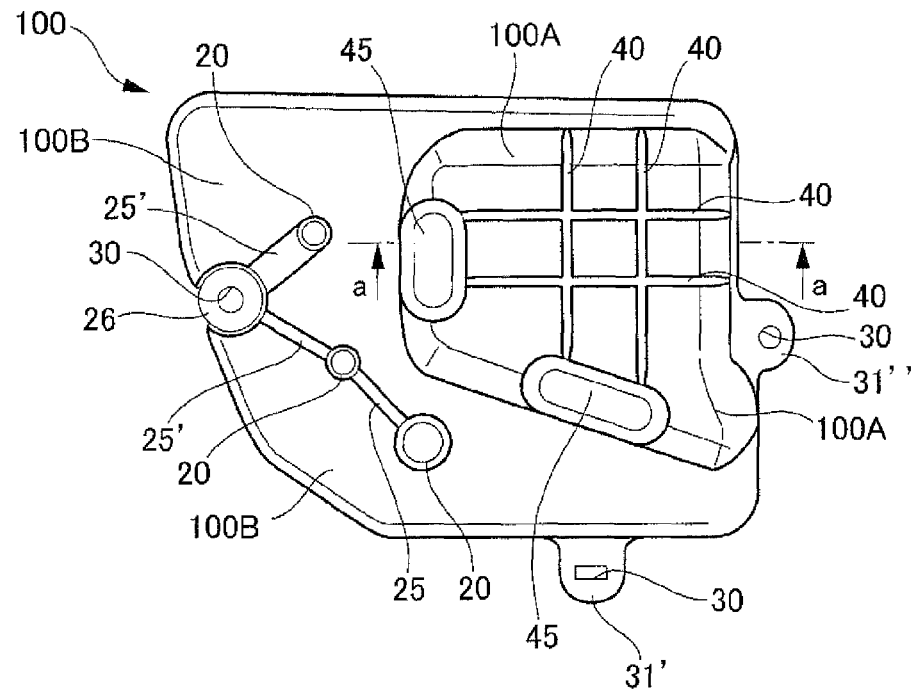
FIG. 8A shows the configuration of a second embodiment of an impact absorber in accordance with the invention.

In the first embodiment, only single groove-like depression 40 is formed in the first portion 100A of the impact absorber 100. However, the invention is not limited to the afore-mentioned configuration, and a plurality of the depressions 40 may be adopted in the invention. For example, as shown in FIG. 8A which corresponds to FIG. 1B, four depressions 40 may be formed such that two parallel depressions 40 intersect with other two parallel depressions 40. However, the invention is not limited to the afore-mentioned configuration, and it may be enough that at least one groove-like depression 40 intersect with other groove-like depression(s) 40.

Furthermore, referring to FIG. 8A, there are provided, for example, two oval concave rib 45 along the boundary (i.e., the step 10) between the first portion 100A and the second portion 100B. In the specification, the oval concave rib may be referred to as a "second concave rib". One of the second concave ribs 45 is connected to each one end of two groove-like depression 40, and the other of the second concave ribs 45 is connected to each one end of other two groove-like depressions 40. During the impact, the second concave rib 45 which is formed at the boundary between the first portion 100A and the second portion 100B can prevent the deformation of the step 10 which is formed between the first portion 100A and the second portion 100B. Furthermore, by connecting the end of each groove-like depression 40 to the second concave rib 45, the stiffness of the entire surface of the first portion 100A can be improved.

Furthermore, referring to FIG. 4, the groove-like depression 40 may have the depth d which increases from the substantially middle portion to each end thereof. Even in this case, the stiffness of the entire surface of the first portion 100A can be improved.

Figure 8B:
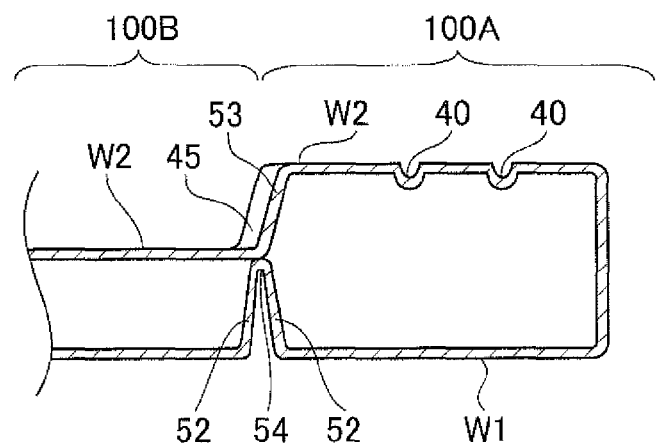
FIG. 8B is a cross-sectional view of FIG. 8A along the line a-a.

Furthermore, FIG. 8B is a cross-sectional view of FIG. 8A along the line a-a. The second concave rib 45 has a joint 54, which is formed by recessing the first wall W1 and the second wall W2 such that the first wall W1 and the second wall W2 approach each other, and joining the tips of the cone-shaped cylindrical bodies 52, 53 as thus obtained each other, viewed from the cross-section. Such a second concave rib 45 may be singular or plural.

Third Embodiment

In the afore-mentioned embodiments, the semicircular concave rib is not formed at the outer periphery of the first portion 100A (except for the boundary between the first portion 100A and the second portion 100B). However, as shown in FIG. 9A which corresponds to FIG. 1B, a semicircular concave rib 50 which is also referred to as a "third concave rib" in the specification, may be formed at the outer periphery of the first portion 100A, and may be connected to the other end of the groove-like depression 40.

Figure 9A:
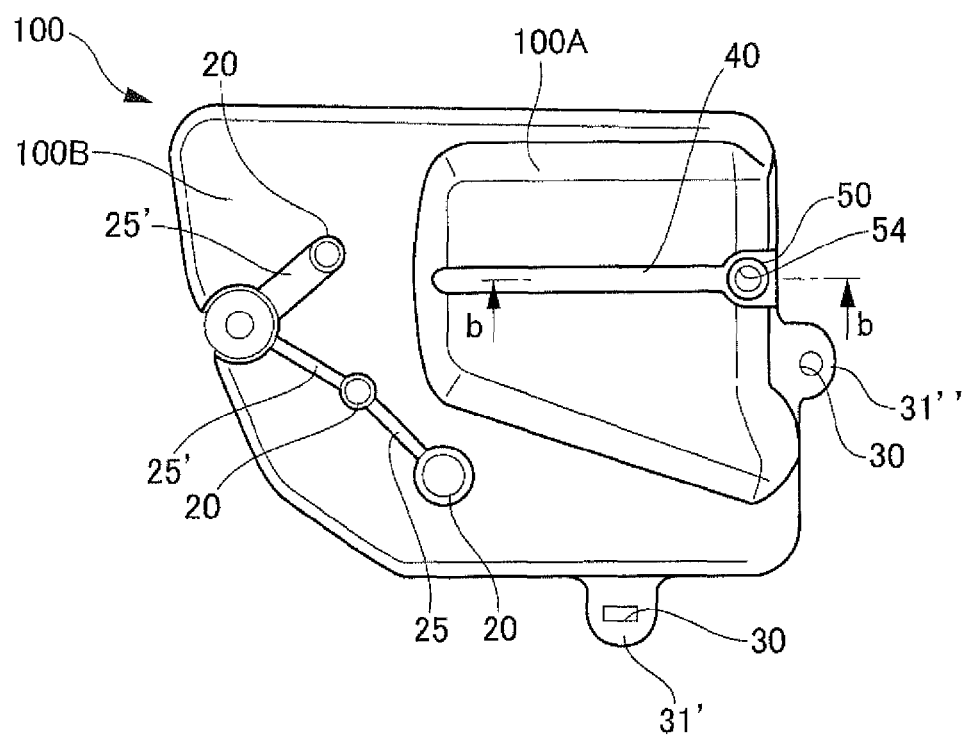
FIG. 9A shows the configuration of a third embodiment of an impact absorber in accordance with the invention.
Figure 9B:
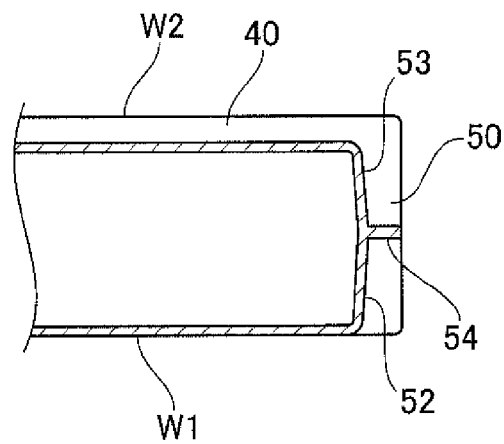
FIG. 9B is a cross-sectional view of FIG. 9A along the line b-b.

Furthermore, FIG. 9B is a cross-sectional view of FIG. 9A along the line b-b. The third concave rib 50 has a joint 54, which is formed by recessing the first wall W1 and the second wall W2 such that the first wall W1 and the second wall W2 approach each other, joining the tips of the cone-shaped cylindrical bodies 52, 53 as thus obtained each other. Such a third concave rib 50 may be singular or plural.

Fourth Embodiment

In any of the afore-mentioned embodiments, the groove-like depression 40 of the first portion 100A is formed in the second wall W2. However, the invention is not limited to the afore-mentioned configuration. The groove-like depression 40 may be formed in the first wall W1. In this case, the depression of the first wall W1 may be preferably formed by modifying the location of the depression 40 of the second wall W2, in a planar view from the wall W1.

Fifth Embodiment

Any of the afore-mentioned embodiments is illustrated with respect to the impact absorber 100 which is disposed between the door panel (i.e., the outer door panel) 3 and the door trim 2 to protect the low back of the passenger P, as shown in FIG. 10B. However, the invention is not limited to the afore-mentioned configuration. The invention may be applied to the impact absorber which is intended to protect the portion(s) of the passenger other than the low back. Even in this case, the impact absorber may be disposed between the vehicle panel and the trim.

While a preferred embodiment of the present invention has been shown and described with particularity, it will be appreciated that various changes and modifications may suggest themselves to one having ordinary skill in the art upon being apprised of the present invention. It is also intended to encompass all such changes and modifications as fall within the scope and spirit of the appended claims.

REFERENCE SIGNS LIST

P: passenger
1: bottom (of seat)
2: door trim (trim)
3: door panel (vehicle panel)
4: low back
4A: pubis 4B: ilium
10: step
20: first concave rib
21, 22: cone-shaped cylindrical portion
23: joint
25: connecting rib
26: semicircular concave rib
27, 28: cone-shaped cylindrical portion
29: joint
30: screw insertion hole
31: portion for coupling impact absorber
40: groove-like depression
45: second concave rib
50: third concave rib
52, 53: cone-shaped cylindrical body
54: joint
100: impact absorber
100A: first portion
100B: second portion
W1: first wall
W2: second wall

The invention claimed is:

1. An impact absorber disposed between a vehicle panel and a trim, comprising:
   a hollow main body having a first wall disposed adjacent to the trim and a second wall disposed adjacent to the vehicle panel and opposed to the first wall, the hollow main body being defined by a first portion and a second portion,
   at least one first concave rib that is formed in the second portion of the hollow main body by (i) recessing the first and second walls such that the first and second walls approach each other and (ii) joining tips of the recessed first and second walls to each other,
   a step formed at a border between the first portion and the second portion, and
   at least one groove-like depression that (i) is not connected to the first wall, (ii) is formed in the first portion of the hollow main body by recessing only the second wall, (iii) traverses an area of the first portion and continuously extends to the step, and (iv) has a depth less than a height of the step, wherein:
   the first portion is different from the second portion in a total thickness extending from the first wall to second wall, and
   the total thickness of the first portion is greater than that of the second portion.

2. The impact absorber according to claim 1, wherein the at least one depression has a depth of 3 mm or above.

3. The impact absorber according to claim 1, wherein the at least one depression has a depth of 25% or below of the total thickness of the first portion.

4. The impact absorber according to claim 1, wherein the at least, one depression has a depth which increases from a middle portion thereof to both ends thereof.

5. The impact absorber according to claim 1, wherein the at least one depression is a plurality of the depressions, and a first depression out of the plurality of depressions intersects with another depression out of the plurality of depressions.

6. The impact absorber according to claim 1, further comprising a second concave rib, which is formed in a boundary between the first portion and the second portion by (i) recessing the first and second walls such that the first and second walls approach each other and (ii) joining tips of the recessed first and second walls to each other.

7. The impact absorber according to claim 6, wherein an end of the at least one depression is connected to the second concave rib.

8. The impact absorber according to claim 1, further comprising a semicircular third concave rib, which is formed in an outer periphery of the first portion not neighboring the second portion by (i) recessing the first and second walls such that the first and second walls approach each other and (ii) joining tips of the recessed first and second walls to each other.

9. The impact absorber according to claim 8, wherein one end of the at least one depression is connected to the third concave rib.

10. The impact absorber according to claim 1, wherein:
    the at least one first concave rib is a plurality of the first concave ribs, and
    the impact absorber further comprises a connecting rib for connecting the plurality of first concave ribs to each other.

11. The impact absorber according to claim 10, wherein the connecting rib is formed by depressing the second wall.

12. The impact absorber according to claim 1, wherein the depth of the at least one groove-like depression increases from a middle portion thereof toward both ends thereof.

13. The impact absorber according to claim 1, further comprising another groove-like depression that is formed by recessing the first wall and that does not overlap the at least one groove-like depression.

* * * * *